United States Patent [19]

Kazlauskas

[11] 4,380,697
[45] Apr. 19, 1983

[54] INTERNAL TUBE WELDING APPARATUS

[75] Inventor: Gasparas Kazlauskas, Sun Valley, Calif.

[73] Assignee: The United States of America as represented by the Secretary of the Navy, Washington, D.C.

[21] Appl. No.: 278,785

[22] Filed: Jun. 29, 1981

Related U.S. Application Data

[63] Continuation-in-part of Ser. No. 222,704, Jan. 5, 1981.

[51] Int. Cl.³ .............................................. B23K 9/225
[52] U.S. Cl. .................................. 219/136; 219/60 R; 219/60.2; 219/125.11
[58] Field of Search ................. 219/60 A, 60.2, 12.11, 219/136, 125.11

[56] References Cited

U.S. PATENT DOCUMENTS

| 3,493,716 | 2/1970 | Martin . |
| 3,621,182 | 11/1971 | Peyrot . |
| 3,688,076 | 8/1972 | Hill et al. . |
| 3,754,115 | 8/1973 | Roberts et al. . |
| 3,815,807 | 6/1974 | Bartley . |
| 4,142,084 | 2/1979 | Torrani . |

FOREIGN PATENT DOCUMENTS 950258 8/1962 United Kingdom ............... 219/60.2

Primary Examiner—Elliot A. Goldberg
Attorney, Agent, or Firm—R. S. Sciascia; Henry Hansen; Armand M. Vozzo, Jr.

[57] ABSTRACT

A hand-held welding torch is disclosed having a pair of foldable handles to permit maneuvering of the torch in confined spaces. The torch is of the type having a non-consummable electrode radially mounted on a longitudinal shaft which can be inserted into the bore of a tubular member and rotated so that the tip of the electrode moves over a circular path around the axis of the tubular member. In one preferred embodiment, a front handle is coupled to a spring-loaded collet having an expanded end and mounted for axial movement about the shaft upon actuation of the front handle. A set of radially-projecting jaws pivotally mounted immediately about the collet are spread outward to positively grip the bore by movement along the expanded end so that the torch is properly positioned in substantially the center of the bore and supported therein during rotation of the electrode. In another preferred embodiment, the front handle is linked to a set of spring-loaded jaws slidably mounted about a fixed collet for releasably gripping the bore.

7 Claims, 4 Drawing Figures

INTERNAL TUBE WELDING APPARATUS

STATEMENT OF GOVERNMENT INTEREST

The invention described herein may be manufactured and used by or for the Government of the United States of America for governmental purposes without the payment of any royalties thereon or therefor.

This application is a continuation-in-part application of patent application Ser. No. 222,704, filed Jan. 5, 1981, by the present inventor.

BACKGROUND OF THE INVENTION

The present invention relates to welding devices and is particularly concerned with an improved shielded-arc welding torch for internally welding tubes to tube sheets or headers, such as are commonly found in the heat exchangers of various power plants.

In the manufacture and repair of industrial and electrical utility power plants, automated welding equipment has been employed to provide consistently high quality welds of internal tube-to-header joints in the heat exchangers of the power plants. Such internal tube-to-header joints generally afford unobstructed access that permits placement of a welding torch without the need for handling by a welder. This facilitates proper positioning of the welding torch at the joint prior to welding and assists in maintaining proper alignment of the torch with respect to the joint during the welding cycle. Accordingly, without a requirement for manual placement of the torch and its associated physical burdens, highly reliable welds are regularly produced.

Many internal tube weld joints, however, are located in very confined spaces of limited accessibility. These difficult-to-reach tube-to-header joints, such as those located in the superheater boilers of ship propulsion systems, generally require manual positioning and support of the welding torch throughout the welding cycle. As a result, unsatisfactory and incomplete welds are evidenced at these relatively inaccessible joints due to either a failure by the welder to initially position the torch properly or his inability to maintain the proper alignment of the torch in the tube while welding.

While existing internal tube welding torches have proven satisfactory in welding the easily accessible tube-to-header joints of various heat exchanger systems, those torches have not been entirely adequate in producing consistent, high quality welds of such joints in closely confined spaces. Previously designed torches have not been able to relieve the physical strains of manually maneuvering the torch into its proper welding position within the confined space and thereafter, continuously supporting the torch in the proper position while welding.

SUMMARY OF THE INVENTION

Accordingly, it is a general purpose and object of the present invention to provide an improved internal tube welding torch for producing welds of uniform quality at the tube-to-header joints of heat exchanger systems.

Another object of the present invention is to provide a shielded-arc welding torch for internally welding tubes that is easy to handle and maneuver in confined spaces so as to relieve physical strains on welders.

A further object of the present invention is to provide an internal tube welding torch that is firmly secured in welding position during its operation so that proper alignment of the torch to the tube is maintained.

A still further object of the present invention is to provide an internal tube welding torch that is simple yet reliable in performance, sturdy in construction, and capable of being coupled to existing automatic welding systems.

Briefly, these and other objects of the present invention are accomplished by a hand-held welding torch having a pair of foldable handles to permit maneuvering of the torch in confined spaces. The torch is of the type having a non-consummable electrode radially mounted on a longitudinal shaft which can be inserted into the bore of a tubular member and rotated so that the tip of the electrode moves over a circular path around the axis of the tubular member. In one preferred embodiment, a front handle is coupled to a spring-loaded collet having an expanded end and mounted for axial movement about the shaft upon actuation of the front handle. A set of radially-projecting jaws pivotally mounted immediately about the collet are spread outward to positively grip the bore by movement along the expanded end so that the torch is properly positioned and supported during rotation of the electrode. In another preferred embodiment, the front handle is linked to a set of spring-loaded jaws slidably mounted about a fixed collet for releasably gripping the bore.

Welding current for the electrode and inert gas for shielding the weld to prevent oxidation are conventionally supplied through the shaft. The torch also includes conventional means for supplying a coolant, such as water, to the vicinity of the electrode via the shaft.

For a better understanding of these and other aspects of the present invention, reference may be made to the following detailed description taken in conjunction with the accompanying drawing in which like reference numerals designate like parts throughout the figures thereof.

DESCRIPTION OF THE PREFERRED EMBODIMENT

Figure 1:
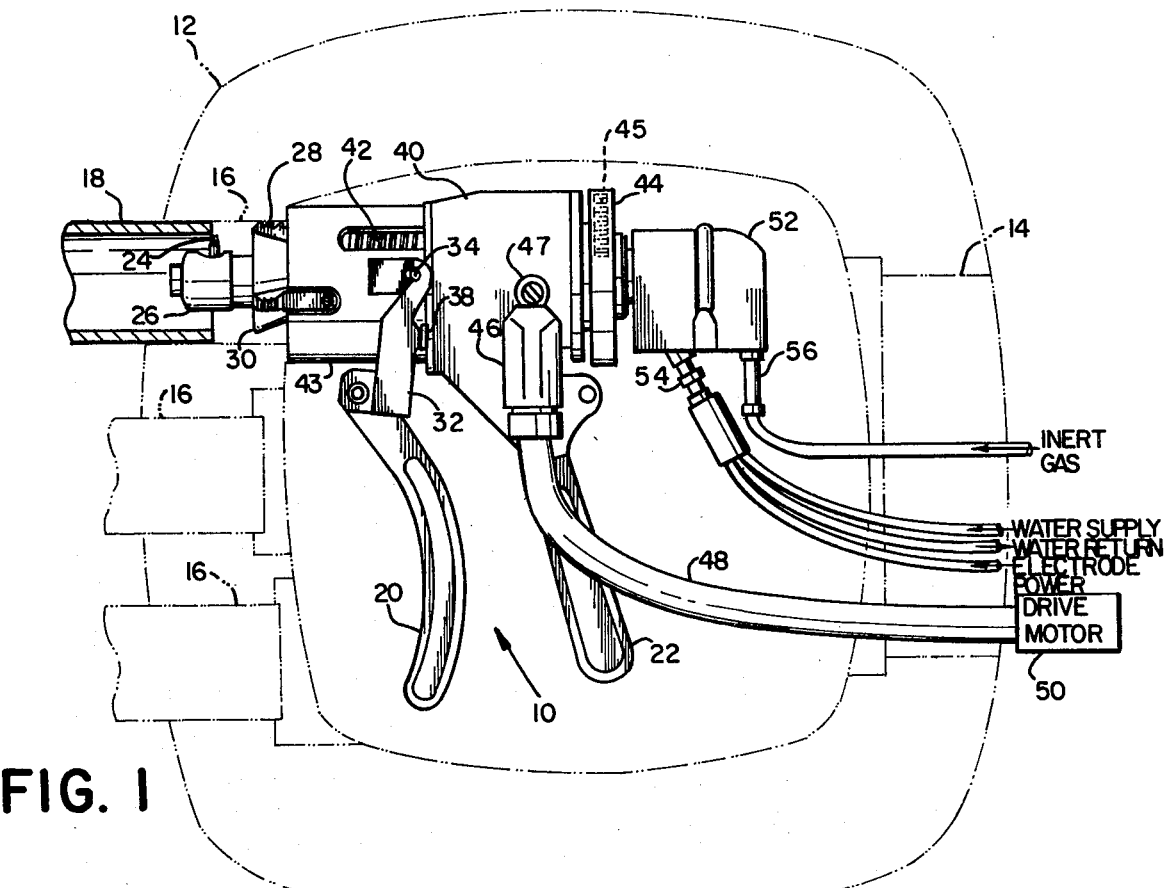
FIG. 1 is a side view of one preferred embodiment of the welding torch according to the present invention shown in its working environment.

Referring now to FIG. 1, a welding torch 10 according to the present invention is shown within the confined working space of a header 12 (in phantom) of a heat exchanger system. The welding torch 10, which may be inserted into header 12 through a hand-hole 14 formed therein, is positioned for welding a tube member 18 to the header, having its front end within one of a number of bores 16 formed in the walls of the header to carry a respective number of the tube members for fluid circulation.

A front handle 20 and a rear handle 22 are pivotally disposed at the bottom of welding torch 10 to provide a pistol-like grip of the torch. The front and rear handles, 20 and 22 respectively, are adapted to fold upwardly toward the main body of torch 10 as described in greater detail hereinafter regarding FIG. 2, thereby reducing the profile of the torch and facilitating its handling and placement within the confined working space. Both handles 20 and 22 are made of a strong but lightweight metal, such as aluminum, having good corrosion resistance, and are formed to provide a comfortable gripping arrangement for a welder.

Figure 2:
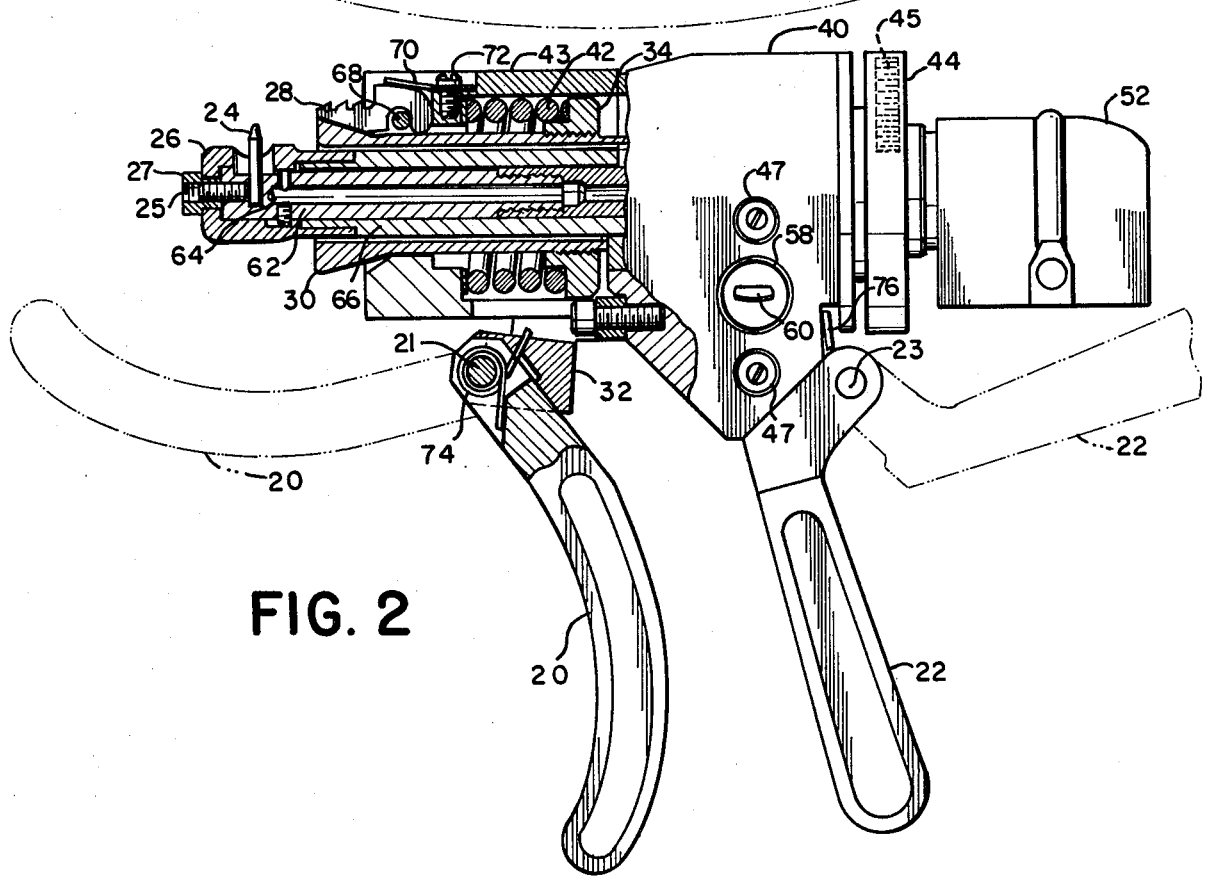
FIG. 2 is another side view, partially cross-sectioned, of the welding torch of FIG. 1.

The body of the welding torch 10 includes an electrode shaft 62, better shown in FIG. 2, longitudinally extending therethrough. Shaft 62 is fabricated from a highly conductive metal, preferably copper, and is rotatably mounted within a main housing 40 by means of a conventional ball bearings (not shown). An electrode 24, made of a non-consumable metal, preferably Tungsten, having a high melting temperature, is securely clamped within a gas cup 26 affixed at the forward end of shaft 62 with a radial opening therein so that the electrode projects substantially perpendicular to the shaft through the opening. A set screw 25 and retaining nut 27 axially threaded through the end of gas cup 26 clamps electrode 24 to shaft 62 and maintains the electrode in a substantially radial direction during rotation of the shaft so that the tip of the electrode traces a circular path about the rotational axis of the shaft. A collar nut 44 encircling shaft 62 and rotatably mounted at the rear of main housing 40 is provided with a radially-adjustable set screw 45 to releasably engage the shaft and thereby permit adjustment of the forward extension of the shaft and electrode 24.

Rotational drive for welding torch 10 is provided by a high torque D.C. gear motor 50 which is coupled to the main housing 40 via a flexible drive cable 48 and an angle drive housing 46. A pair of adjustable screw clamps 47 are attached to the side of main housing 40 about a recess 58 formed therein to engage angle drive housing 46 and lock it in a stationary position within the recess when connected to the main housing. The angle drive housing 46 is coupled to the electrode shaft 62 by a conventional worm and gear arrangement (not shown) mounted within main housing 40, the drive housing engaging the end of a worm shaft member 60 set transversely within the main housing and protruding at recess 58, as shown more clearly in FIG. 2.

A manifold block 52 fabricated from a metal material similar to that of electrode shaft 62 is adapted to engage the rear end of the shaft without restricting its rotation to permit coupling of torch 10 to various external operating systems. A main fitting 54 releasably secured to the bottom of manifold block 52 couples torch 10 to source of electrical power for electrode 24 and to a fluid coolant for circulation about electrode shaft 62. Electrode power for welding is typically provided by a regulated D.C. power source having a welding current output in the range of 5 to 200 Amps and an output voltage range of 0 to 30 volts. The fluid coolant typically used is water or a solution of 50% water and 50% ethylene gylcol, and is conventionally circulated within manifold block 52 about electrode shaft 62 to keep electrode 24 reasonably cool during welding. Manifold block 52 is further provided with a supply of a chemically inert gas, either Argon or Helium or a combination of each, via a tube fitting 56 affixed to the bottom of the manifold block. In a conventional manner, the manifold block 52 is vented to a tubular passage 64 formed longitudinally within electrode shaft 62, as shown more clearly in FIG. 2, so that the supply of inert gas is permitted to flow forward into gas cup 26 and be directed onto the weld area for shielding purposes.

It should be noted that the welding system for torch 10, namely, the supply of rotational drive, electrode power, coolant flow and shielding gas, may be automatically controlled by a commercially available control unit for cyclic operation. Typically, a complete system cycle would include: a gas pre-purge phase to saturate the weld area with the inert gas; a preheat phase to raise the weld area temperature, preferably to about 350°-400° F.; a welding phase during which electrode power is provided to produce weld currents, preferably in alternating pulses of high and low amperage values, for fusing the joint; a post-heat phase to stress relieve the welded joint; a finish-slope phase in which the weld current is gradually reduced to zero to eliminate any weld imperfections; and a post-purge phase wherein the welded joint is saturated with the inert gas until the joint and electrode 24 are cooled and non-reactive. One such available welding control unit is the Model E-200-T4-2042 Automatic Tube Welding Facility manufactured by the Astro-Arc Company.

Figure 3:
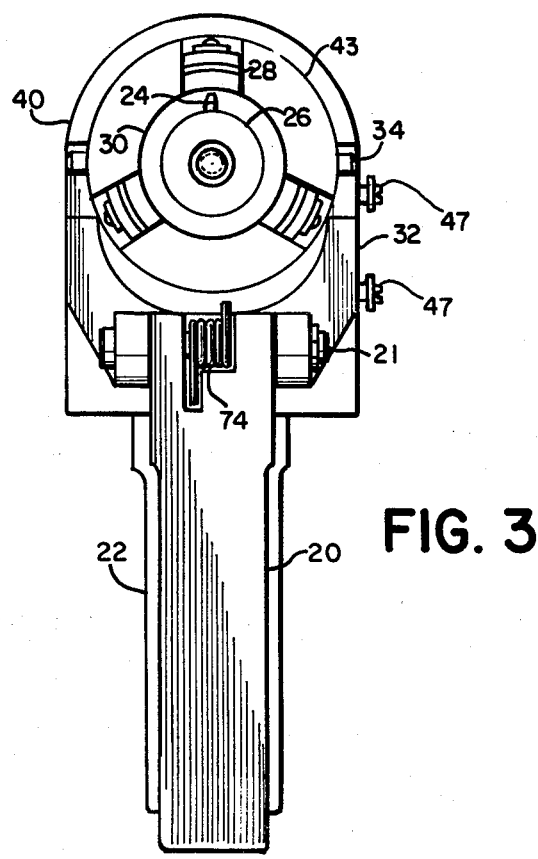
FIG. 3 is a front end view of the welding torch of FIG. 2.

Referring now to FIGS. 2 and 3 in conjunction with FIG. 1, a cylindrical insulator sleeve 66 is formed to fit securely over electrode shaft 62 and connect to gas cup 26 near the front end of the shaft so that the sleeve, shaft, and gas cup rotate as a unit. A longitudinal collet 30 having an expanded outer surface at one end thereof and a threaded surface at the other end is adapted to be mounted concentrically about insulator sleeve 66 just rearward of gas cup 26. Collet 30 is disposed along insulator sleeve 66 with its expanded end forward and is provided with an inner diameter sufficiently larger than the outer diameter of the insulator sleeve so as to move freely over the sleeve and not restrict its rotation. An internally-threaded collet nut 34 engages the threaded end of collet 30 and serves to provide a hold for axial movement of the collet over insulator sleeve 66.

A plurality of jaw segments 28, preferably at least three in number, are symmetrically disposed in a radial pattern about the forward end of collet 30. Each jaw segment 28 is formed, typically of a hardened steel material, having a toothed surface on one side thereof and an inclined surface on the opposite side. The toothed surface of each segment 28 is preferably curved to complement the diameter of bore 16 while the inclined surface is shaped to complement the expanded outer surface of collet 30. Each jaw segment 28 is pivotally mounted about the outer surface of collet 30 upon a dowel pin 68 which fits into a notch formed transversely in each segment on the side of the inclined surface. A cylindrical nosepiece 43, adapted to be connected at its rear end to main housing 40, is formed having axially-directed slots in its forward end to hold each jaw segment 28 and its respective dowel pin 68 in proper radial position about collet 30 with the toothed surface of each segment projecting outward in a substantially radial direction. A flat spring 70, assembled over each jaw segment 28 and secured to nosepiece 43 via an associated screw 72, contains the pivotal movement of each segment within the nosepiece.

Nosepiece 43 is fabricated of a material similar to that of main housing 40 and is provided with a substantially circular cavity counterbored from the rear end of the nosepiece for slidingly housing the collet 30 and collet nut 34. A coiled tension spring 42 is formed from a conventional spring steel to fit within the counterbored cavity of nosepiece 43 and is positioned therein to urge rearward against collet nut 34 thereby forcing collet 30 to travel axially backward along insulator sleeve 66. As a result of the urging of tension spring 42, the expanded end of the collet 30 is moved rearward in sliding contact beneath each jaw segment 28 to pivotally spread the segments outward and provide positive gripping of bore 16.

Collet nut 34 is adapted to be coupled to a yoke 32 through slots on both sides of nosepiece 43 that permit the collet nut to travel a limited distance forward within the nosepiece. The yoke 32 is a U-shaped member pivotally connected at its base to front handle 20 via hinge pin 21, the base of yoke 32 being configured to permit forward rotation of the front handle into a folded position (phantom in FIG. 2). The base of yoke 32 is formed to prevent rearward rotation of the front handle 20 about hinge pin 21 and thereby provide integral lever-like movement of the front handle and the yoke when rearward pressure is applied to the front handle. Yoke 32 is adapted at its uppermost part to engage collet nut 34 on each side of nosepiece 43 and is designed to pivotally contact main housing 40 at fulcrum blocks 38 attached to the front edge of the main housing on each side thereof so that handle actuation of the yoke moves the collet nut and collet 30 axially forward against the force of tension spring 42. As a result, the expanded end of collet 30 is advanced outward from beneath the inclined interior surface of jaw segments 28 and the jaw segments pivot inward about dowel pins 68 permitting the toothed surfaces to be radially depressed for proper placement and positioning of the torch 10 within bore 16.

A front torsion spring 74 is disposed about hinge pin 21 and is formed to interengage the front handle 20 and yoke 32 so that the front handle is normally maintained in a downward position and automatically returned thereto from the folded position when released. A rear torsion spring 76 like front spring 74 is similarly mounted about hinge pin 23 that pivotally connects rear handle 22 and main housing 40 so that the rear handle is automatically returned from a folded position (phantom in FIG. 2) into a normal downward position for gripping the torch 10 during placement and operation.

In actual operation, therefore, a welder utilizing torch 10 may maneuver and direct the torch through header 12 to a specific welding site in a folded configuration wherein front handle 20 and rear handle 22 are both rotated upwardly about respective hinge pins 21 and 23 to provide the torch with a reduced longitudinal profile. At the welding site, when front handle 20 and rear handle 22 are released from their folded positions, as shown in phantom in FIG. 2, torsion springs 74 and 76 act to swing the front and rear handles, respectively, downward into extended gripping positions that assist in the proper placement of the torch 10 for welding.

To position the electrode 24 properly within bore 16, a squeezing force is exerted upon front handle 20 and transmitted via yoke 32 in a leverlike fashion to collet nut 34. Pivoting upon fulcrum blocks 38, yoke 32 moves collet nut 34 and the collet 30, threadedly secured thereto, forwardly in an axial direction within nosepiece 43 against the force of tension spring 42. The expanded front end of collet 30 is thereby advanced along the rotatable insulator sleeve 66 and electrode shaft 62 outward from beneath each of the jaw segments 28, pivotally mounted around the collet within slots at the front end of nosepiece 43. Pivoting about respective dowel pins 68 and contained by associated flat springs 70, the jaw segments 28 are depressed radially to permit their toothed surfaces to fit within bore 16. Front handle 20 is then released permitting tension spring 42 to expand rearward against collet nut 34 and thereby retract the expanded front end of collet 30 beneath jaw segments 28 so that their toothed surfaces are radially spread in a symmetrical manner providing positive gripping of bore 16 and firm support of the torch 10 during welding. Accordingly, gas cup 26 and electrode 24, the forward extension of which is set by collar nut 44 and set screw 45, are maintained in proper alignment in substantially the center of bore 16 as they rotate during the system cycle.

Figure 4:
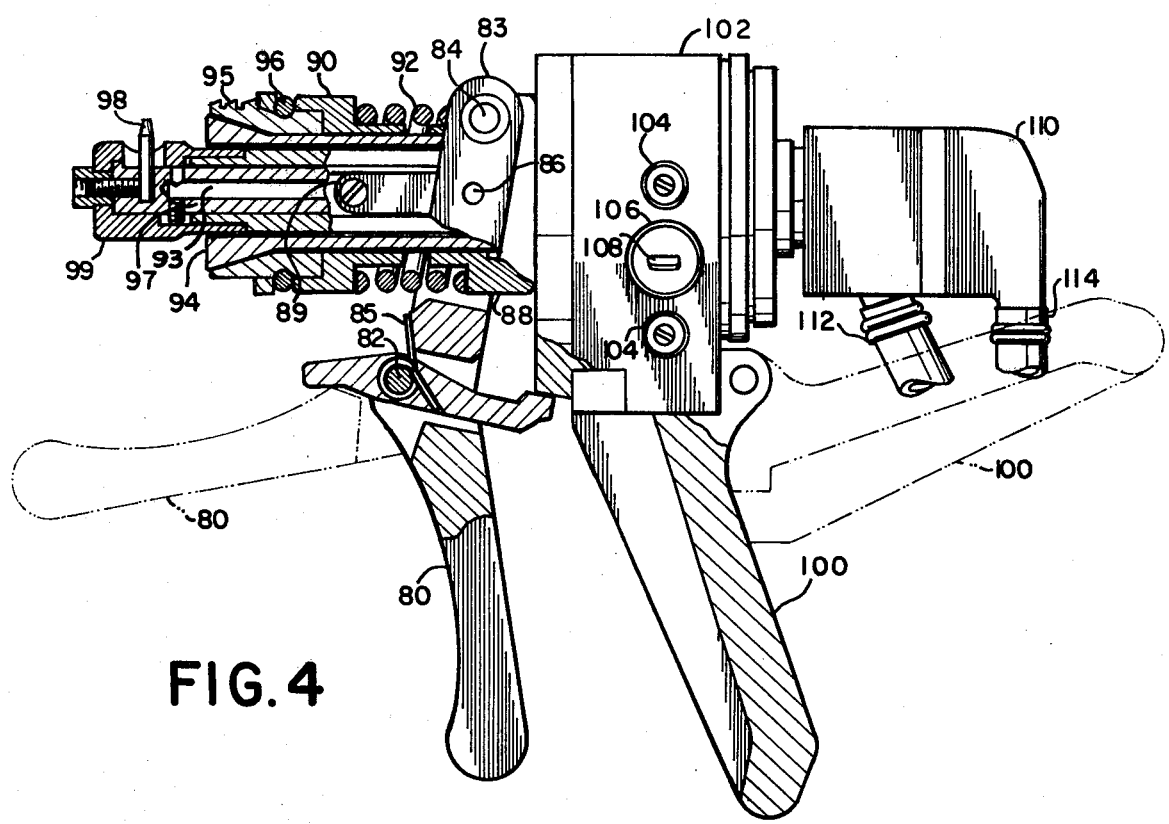
FIG. 4 is a side view, partially cross-sectioned, of another preferred embodiment of the welding torch according to the present invention.

Referring now to FIG. 4, another preferred embodiment of the present invention is shown including a main housing 102 within which an electrode shaft 97 is rotatably mounted, and a manifold block 110 operatively secured about the rearward end of the shaft for coupling external operating systems to the shaft via fitting 112 and 114. Similar to the aforedescribed housing 40, main housing 102 is provided on either side with a recess 106 in which the end of a worm shaft 108 set transversely within the main housing is accessible for transmitting rotational drive to electrode shaft 97. A pair of clamps 104, similar to the clamps 47 previously described, are releasably secured to the side of main housing 40 for engaging an angle drive housing (not shown) like housing 46 shown in FIG. 1.

An electrode 98 is radially disposed and mounted within gas cup 99 at the front end of electrode shaft 97 so that the electrode, gas cup, and shaft rotate as an integral unit in a similar fashion as that assembly described with regard to FIG. 2. A tubular channel 93 is also formed longitudinally within electrode shaft 97 to connect with gas cup 99 for the supply of shielding gas to the welding area.

A front handle 80 and rear handle 100 are pivotally adapted to rotate into folded positions, shown in phantom, to reduce longitudinal profile and ease maneuverability of the torch in confined spaces. Both handles 80 and 100 are spring loaded so that each returns downward to normal gripping positions, the front handle being further provided with a latch member 81 coupled thereto about hinge pin 82 and configured to engage the rear handle in the downward position.

A collet 94 having an expanded outer surface at its front end, like collet 30 previously described, is threadedly secured at the opposite end to a nose cover 88. Nose cover 88 is attached to main housing 102 so that collet 94 is fixed in position about shaft 97. A set of jaw segments 95 having toothed surfaces on one side thereof and an inclined surface on the other, like segments 28, are slidably mounted in a symmetrical arrangement about collet 94 near its front end. The jaw segments 95 are set within a jaw holder 90 adapted to slide over the main body of collet 94, and a retaining ring 96 formed to fit around the jaw holder interlocks the jaw segments 95 therein. A coiled tension spring 92 having a sufficient inner diameter to fit about the main body of collet 94 is disposed between jaw holder 90 and nose cover 88 so that a forward pressure is exerted on the jaw segments 95 via the jaw holder. As a result, jaw segments 95 are normally advanced forward completely around the expanded front end of collet 94 with the toothed surfaces of each jaw segment having a maximum radial projection.

A U-shaped yoke 83 is adapted at its bifurcated end to hingedly engage the upper portion of nose cover 88 by means of a dowel pin 84 set transversely through the nose cover. The yoke 83 is pivotally connected at its base to the top of front handle 80 permitting the front handle to be rotated upward and forward about hinge pin 82 into its folded position. Torsion spring 85 is centrally disposed about hinge pin 82 and is configured to interengage yoke 83 and front handle 80 so that the yoke and front handle move integrally upon application of rearward pressure to the handle. A link arm 89 secured about midway along each side of yoke 83 by a respective dowel pin 86 extends forward to be connected to each side of jaw holder 90 for drawing jaw segments 95 back against torsion spring 92 and along collet 94 upon rearward movement of the yoke.

Accordingly, as the welder inserts the electrode 98 and gas cup 99 into a tube or bore for welding, squeezing pressure is applied between front and rear handle 80 and 100, respectively. The squeezing pressure swings yoke 83 rearward about dowel pin 84 thereby drawing the jaw holder 90 and associated jaw segments 95 back along collet 94 via link arms 89. With the jaw segments 95 drawn back against the force of tension spring 92, the radially projecting toothed surfaces are retracted to permit the front end of collet 94 to be inserted into the tube or bore. Once collet 94 is inserted, front handle 80 is released, permitting tension spring 92 to return jaw holder 90 forward and simultaneously advance each of the jaw segments 95 over the expanded front end of collet 94. The radially-projecting tooth surfaces of jaw segments 95 are thus spread outward to firmly grip the inside of the tube or bore thereby supporting the torch and centering the rotating electrode 98 during the welding system cycle.

Therefore, it is apparent that the disclosed invention provides an improved internal tube welding torch for producing consistent, high-quality welds of tubular members to their support plates, particularly useful for the tube-to-header joints of various heat exchanger systems. Furthermore, the disclosed internal tube welding torch provides a device that is easy to handle and maneuver in confined spaces so as to relieve the physical strain on welder required to work in such spaces, and that is firmly secured in a welding position during its operation so that proper alignment of the torch within the tube is maintained. In addition, the disclosed welding torch is simple yet reliable in performance, sturdy in construction, and capable of being coupled to existing automatic welding systems.

Obviously, other embodiments and modifications of the present invention will readily come to those of ordinary skill in the art having the benefit of the teachings presented in the foregoing description and drawings. It is therefore to be understood that various changes in the details, materials, steps, and arrangement of parts, which have been described and illustrated to explain the nature of the invention, may be made by those skilled in the art within the principle and scope of the invention as expressed in the appended claims.

What is claimed is:

1. An apparatus for welding the inside of a circular opening, comprising:
    a housing;
    an electrode shaft member rotatably mounted within said housing;
    jaw means coupled to said housing and movable about said electrode shaft member for releasably gripping the inside of the circular opening;
    handle means pivotally coupled to said housing for actuating said jaw means, said handle means being rotatable to permit folding thereof;
    a collet disposed about said electrode shaft member and having an expanded outer surface at the forward end thereof;
    a plurality of radially-projecting jaw segments movable over and in sliding contact with the expanded outer surface of said collet;
    said collet is fixed about said electrode shaft member; and
    said jaw segments are mounted to move axially over said collet.

2. A welding apparatus according to claim 1, wherein:
    said jaw segments are symmetrically arranged about the forward end of said collet and are at least three in number.

3. A welding apparatus according to claim 1, wherein said jaw means further comprises:
    a spring member operatively connected to said housing for urging said jaw segments forward over the expanded outer surface of said collet.

4. A welding apparatus according to claim 3, wherein said handle means comprises:
    a yoke member formed to operatively engage said collet and pivotally coupled to said housing for moving said collet forward over said electrode shaft member against the urging of said spring member;
    a front handle rotatably coupled to said yoke member so that said front handle moves forwardly into a folded position, said front handle being adapted to integrally engage said yoke in a rearward direction;
    a first torsion spring coupled between said yoke member and said front handle for urging said front handle in a rearward direction;
    a rear handle rotatably coupled to said housing so that said rear handle moves rearwardly into a folded position, said rear handle being adapted to integrally engage said housing in a forward direction; and
    a second torsion spring coupled between said rear handle and said housing for urging said rear handle in a forward direction.

5. A welding apparatus according to claim 1, further comprising:
    said electrode shaft member having a tubular passage formed longitudinally therethrough;
    means for supplying an inert gas to the tubular passage of said shaft member; and
    a gas cup mounted at the forward end of said shaft member and coupled to the tubular passage, said cup having an opening radially formed therein to direct the inert gas for shielding.

6. A welding apparatus according to claim 5, further comprising:
    drive means for rotating said electrode shaft member;
    electrical means for supplying current to said shaft member; and
    fluid means for circulating a coolant around said shaft member.

7. A welding apparatus according to claim 6, further comprising:
    an electrode secured to the forward end of said shaft member, said electrode being radially disposed through the opening in said gas cup.

* * * * *